US007500252B1

(12) United States Patent
Angeline et al.

(10) Patent No.: US 7,500,252 B1
(45) Date of Patent: Mar. 3, 2009

(54) SYSTEM AND METHOD FOR BRIDGING OBJECT SYSTEMS

(75) Inventors: Dennis Angeline, Mill Creek, WA (US); Christopher W. Brumme, Mercer Island, WA (US); William G. Evans, Woodinville, WA (US); Raja Krishnaswamy, Redmond, WA (US); David S. Mortenson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 314 days.

(21) Appl. No.: 11/102,005

(22) Filed: Apr. 8, 2005

Related U.S. Application Data

(63) Continuation of application No. 09/820,433, filed on Mar. 29, 2001, now Pat. No. 6,883,172.

(51) Int. Cl.
*G06F 13/00* (2006.01)

(52) U.S. Cl. .................. 719/330; 719/311; 719/312; 719/316; 719/328

(58) Field of Classification Search ................ 719/316, 719/332, 330, 311, 312, 328
See application file for complete search history.

(56) References Cited

U.S. PATENT DOCUMENTS

| 5,475,845 | A |   | 12/1995 | Orton et al. |
|---|---|---|---|---|
| 5,732,270 | A |   | 3/1998 | Foody et al. |
| 5,923,877 | A | * | 7/1999 | Berner et al. ............ 717/108 |
| 5,963,955 | A |   | 10/1999 | Melahn et al. |
| 6,016,392 | A | * | 1/2000 | Jordan ..................... 719/328 |
| 6,085,030 | A | * | 7/2000 | Whitehead et al. ......... 709/203 |
| 6,118,446 | A |   | 9/2000 | Jones et al. |
| 6,336,148 | B1 | * | 1/2002 | Doong et al. ............. 719/316 |
| 6,510,550 | B1 | * | 1/2003 | Hightower et al. ......... 717/108 |
| 6,629,192 | B1 | * | 9/2003 | Schaefer et al. .......... 711/103 |
| 6,640,255 | B1 | * | 10/2003 | Snyder et al. ............ 719/315 |
| 6,829,772 | B2 | * | 12/2004 | Foote et al. .............. 719/330 |
| 6,857,015 | B1 | * | 2/2005 | Michaud et al. .......... 709/224 |
| 6,862,735 | B1 | * | 3/2005 | Slaughter et al. .......... 719/315 |
| 6,879,991 | B2 | * | 4/2005 | Bacon ..................... 707/206 |
| 7,082,553 | B1 | * | 7/2006 | Wang ...................... 714/38 |
| 7,127,460 | B2 | * | 10/2006 | Nixon et al. ............... 707/8 |
| 2006/0200488 | A1 | * | 9/2006 | Chu-Carroll et al. ....... 707/102 |

OTHER PUBLICATIONS

M. Mattsson, et al. Framework Integration Problems, Causes, Solutions. Communications of the ACM, vol. 42, No. 10. Oct. 1, 1999, pp. 81-87.

* cited by examiner

*Primary Examiner*—Andy Ho
(74) *Attorney, Agent, or Firm*—Amin, Turocy & Calvin, LLP

(57) ABSTRACT

A system and method is provided for bridging disparate object systems. The system includes a first wrapper to bridge communications between a first object system and a second object system and a second wrapper to bridge communications between the second object system and the first object system. The first wrapper insulates the first object system from interface implementations in the second object system and the second wrapper insulates the second object system from interface implementations in the first object system to facilitate transparent communications between the first and second object systems. The first object system may be at least one of a managed object system and an unmanaged object system, and the second object system may be at least one of a managed object system and an unmanaged object system.

19 Claims, 10 Drawing Sheets

SYSTEM AND METHOD FOR BRIDGING OBJECT SYSTEMS

CROSS-REFERENCE TO RELATED APPLICATIONS

This application is a Continuation of U.S. Pat. No. 6,883,172, filed on Mar. 29, 2001, and entitled SYSTEM AND METHOD FOR BRIDGING OBJECT SYSTEMS, the entirety of which is incorporated herein by reference.

TECHNICAL FIELD

The present invention relates generally to computer systems, and more particularly to a system and method to enable communications between one or more disparate (e.g., managed/unmanaged) object systems, wherein wrappers are employed to insulate a first object system from architectural differences in a second object system and to facilitate seamless communications therebetween.

BACKGROUND OF THE INVENTION

As computer science has evolved, object oriented programming has become one of many familiar models designers and programmers utilize to implement functionality within computer systems. The object model generally is defined by a class structure that includes class members providing both methods and associated data elements belonging to the class. The class members thus provide/define desired functionality within a computer program, wherein an object is declared as an instance of a particular class. As is commonplace, objects often must exchange data and/or invoke other objects operating on the same platform and/or communicate with objects belonging to remote platforms. In order to communicate between objects, interface systems and standards have been developed to define how objects may communicate and/or interact with one another. A familiar system for communicating and interfacing between objects is known as the Component Object Model (COM), wherein another similar system is referred to as the Common Object Request Brokers Architecture (CORBA). Still yet other communication interfaces may be defined in languages such as JAVA within an operating framework of a Java Virtual Machine, for example. As these and other systems have been developed however, two common object architectures or models generally have emerged and may generally be defined in terms of managed and unmanaged object systems, for example.

Managed objects may be allocated from a heap within a managed software environment and are generally not responsible for managing associated object lifetimes. Managed objects may be described in terms of a data type (e.g., metadata) and automatically collected (e.g., reclaimed) by a managed environment "garbage collector" that removes the object from memory when the object is no longer being accessed. In contrast, unmanaged objects may be allocated from a standard operating system heap, wherein the object itself is responsible for freeing memory it employs when references to the object no longer exist. This may be accomplished through well-known techniques such as reference counting, for example.

As described above, managed objects may be allocated from a managed heap and automatically garbage collected. In order to achieve this, references to managed objects are traced. When a last reference to an object is removed, the garbage collector reclaims the memory occupied by the object mitigating the need to reference count managed objects. Thus, a managed environment essentially handles reference counting internally. Tracing is possible within managed code because the managed environment keeps track of outstanding references that exist on an object. As each new object reference is declared within managed code, the managed environment adds the reference to a list of live references. At any given time, the managed environment, rather than the object itself, is thus aware of live references that exist on a given object. As references fall out of scope or change value, the list of live references is updated, and as long as a reference remains within managed code, the managed environment is able to trace it. Unfortunately, object references originating from unmanaged code present difficulties when interacting with a managed environment.

One difficulty associated with unmanaged references operating in a managed environment relates to that there is substantially no straightforward way for managed environments to trace references from unmanaged code to managed objects. Even if the managed environment were aware of these references, generally, no information is maintained indicating whether a reference is active or inactive. Thus, since unmanaged clients, for example, are written in unmanaged code, presently, there is not a process for tracing references that unmanaged objects may hold on managed objects executing within a managed environment. Similarly, originating calls from managed environments to unmanaged environments also presents problems relating to managing object lifetimes. For example, unmanaged objects expect to be reference counted, but in a managed environment reference counting is not required for managed objects. It would thus be very confusing if developers that design managed code had to handle references to managed and unmanaged objects differently.

Along with object lifetime management problems described above, managed and unmanaged object systems generally differ in many other significant ways. These differences may include how the object systems provide object interfaces within the respective object systems, how data is structured and/or defined, and how errors and exceptions are handled, for example. Due to these and other differences between managed and unmanaged object systems, it is presently difficult, time consuming, and expensive in terms of development costs to have objects from an unmanaged system interface and interact with objects from a managed system and visa versa. Moreover, it is generally difficult for managed objects designed according to one object system framework to communicate with objects from an architecturally different managed system framework. This also applies to unmanaged object communications between diverse unmanaged system frameworks.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to bridging communications between disparate object systems. A service is provided to enable bi-directional communications between object systems that may support different languages, architectures and object system interfaces. The service generates a wrapper and associated interfaces the object systems utilize and enables the respective object systems to be insulated from implementation details and inconsistencies of the other object systems. Thus, code associated with one object system may transparently interact with code written for another object system via the wrappers and associated interfaces. In order to bridge communications in accordance with the present invention, a plurality of system inconsistencies and/or disparities are considered and provided for within the wrappers. These provisions may include: interface based versus class based interface considerations, reference counted versus garbage collected management considerations, managed versus unmanaged code generation considerations, metadata versus type library information conversions, strict identity versus loose identity type considerations, exception versus result handling considerations and inheritance versus aggregation considerations. Other provisions may include late/early binding considerations, data marshalling considerations, inheritance/extensibility point considerations, and execution environment context considerations.

In accordance with the present invention, managed objects are not referenced by unmanaged objects directly, instead, a wrapper is provided that is referred to as an Unmanaged Callable Wrapper (UCW) and acts as a proxy for a managed object. The UCW is not garbage collected and therefore can directly be referenced by unmanaged objects and clients. The object that is wrapped, however, is garbage collected like any other managed object. The UCW is responsible for handling substantially all aspects of the interaction between managed objects and unmanaged clients/objects. For example, the UCW handles data type marshaling and the translation of managed exceptions into unmanaged results. In general, the UCW simulates an unmanaged interface to enable an unmanaged object/client to interact with a managed object/server. The unmanaged object/client can transparently interact with what appears to be an unmanaged server that is actually served by a managed server/object in a managed object system. From the managed server/object perspective, the unmanaged object appears as a managed client/object that is requesting object services from the managed object system.

When managed objects/clients interact with unmanaged object/servers, the present invention provides another type of wrapper class referred to as a Managed Callable Wrapper (MCW). The MCW is a managed object that acts as a proxy for a reference counted unmanaged object. The MCW may be garbage collected in a familiar manner but also maintains an internal cache of interface pointers on a single unmanaged identity. The internal interface pointers cached by the MCW are reference counted like other unmanaged interfaces, however, references to the MCW itself are traced. The MCW is responsible for handling substantially all aspects of the interaction between managed clients/objects and unmanaged servers/objects. This includes maintaining object identity, data marshaling and exception handling. In general, the MCW simulates a managed interface to enable a managed object/client to interact with an unmanaged object/server. The managed object/client can transparently interact with what appears to be a managed server that is served by an unmanaged server/object in an unmanaged object system. From the unmanaged server/object perspective, the managed object appears as an unmanaged client/object that is requesting object services from the unmanaged object system.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to a system and methodology to facilitate bridging between architecturally different object systems (e.g., managed/unmanaged, managed/managed, unmanaged/unmanaged). Wrappers are provided to enable objects in one object system to be insulated from implementation details in another object system and to facilitate communications between the object systems. Insulation enables code developers in a first object system to transparently interact with objects provided by an architecturally dissimilar object system as though the dissimilar object system were part of and/or incorporated within the first object system. For example, an unmanaged client can interact/communicate with a managed server as if the managed server were an unmanaged server. Similarly, a managed client may interact with an unmanaged server as though the unmanaged server were a managed server. In this manner, much time and development costs are saved since developers are abstracted from implementation details of transferring data and interfacing to remote objects across architecturally diverse systems. It is to be appreciated that other bridging systems may be constructed in accordance with the present invention. For example, the wrappers and other interfaces described below may be utilized to bridge dissimilar unmanaged to unmanaged object systems and/or dissimilar managed to managed object systems.

Figure 1:
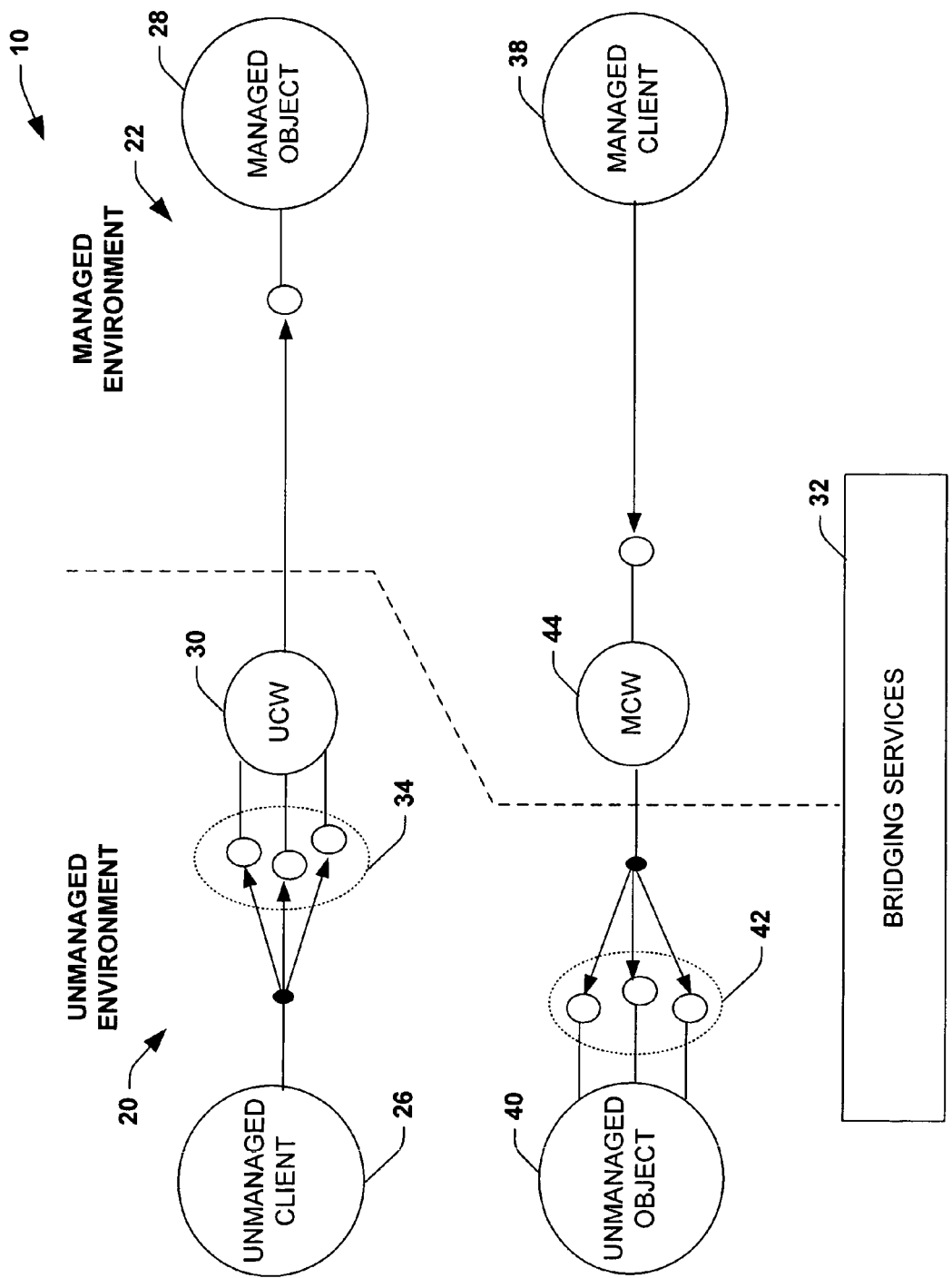
FIG. 1 is a schematic block diagram illustrating bridging between disparate object systems in accordance with an aspect of the present invention.

Referring initially to FIG. 1, a system 10 illustrates bridging between disparate object systems in accordance with an aspect of the present invention. The system 10 is illustrated in a bifurcated manner, wherein communications and interactions between disparate object systems may occur from an unmanaged environment 20 to a managed environment 22 and visa versa. It is noted that the unmanaged and managed environments 20 and 22 may exist on the same system or may communicate remotely over a network, for example, and may include bridging between dissimilar objects belonging to one or more managed systems and/or dissimilar objects belonging to one or more unmanaged systems. Although the following description generally relates to bridging between managed and unmanaged object systems for exemplary purposes, it is to be appreciated that bridging can occur between other architecturally different object types.

The following description first details utilizing managed objects from the unmanaged environment 20, wherein an unmanaged client 26 accesses services provided by a managed object 28. When the unmanaged client 26 creates an instance of the managed object 28, the managed object 28 is exposed through an Unmanaged Callable Wrapper (UCW) 30 that acts as a proxy for the managed object 28. The UCW 30 is generally not "visible" within the managed environment by other managed classes/objects, however, the UCW 30 is utilized for marshaling calls between managed and unmanaged code. This enables transparent interaction between the unmanaged and managed environments and provides insulation from architectural differences between the environments. Thus, developers in one object system generally do not have to account for implementation details (e.g., design custom interface code) in the other object system. Each managed object referenced outside the managed environment 22 provides a single UCW regardless of the number of references that exist on the managed object 28. This facilitates that a single object identity is shared between the UCW and the unmanaged client 26. It is to be appreciated that although the above discussion details a single unmanaged client and managed object, a plurality of such clients/objects may be employed in accordance with the present invention.

As described above, the UCW 30 may be viewed as a proxy for the managed object 28 being referenced from the unmanaged environment 20. Thus, the UCW 30 is transparent to the managed object 28 that is referenced by the UCW 30 in contrast to a managed client. A UCW reference on the managed object 28 is traced like any other managed reference, wherein the unmanaged client's reference on the UCW 30 is reference counted like any other unmanaged reference. If multiple unmanaged clients (not shown) share a reference to the same managed object 30, a bridging services component 32 is provided to direct the multiple references to the same UCW 30. In other words, there should not exist more than one UCW 30 for any instance of the managed object 28. As will be described in more detail below, the bridging services component 32 provides type information/conversion between the managed and unmanaged environment to enable unmanaged clients to bind/interface to managed objects and managed clients to bind to unmanaged objects.

During an activation process, the managed environment 22 instantiates the managed object 28 as well as the UCW 30. The managed object 28 is allocated from a garbage-collected heap (not shown) while the UCW 30 is allocated from a non-collected heap. This enables the managed environment 22 to move the object 28 in memory as necessary. The UCW 30 holds a single reference to the managed object 28 in order to keep the object 28 active as long as the UCW is active. Since the UCW 30 is allocated in non-collected memory, the managed environment 22 is freed to distribute interface pointers 34 on the UCW 30 to the unmanaged client 26. The UCW 30 is reference counted like other unmanaged objects. When the reference count reaches zero, for example, the UCW 30 discontinues tracing the reference on the managed object 28, wherein the managed object is reclaimed during the next garbage collection.

In accordance with the present invention, a managed client 38 may communicate and interact with an unmanaged object 40. When the managed client 38 creates an instance of the unmanaged object 40, the unmanaged object and associated interfaces 42 are exposed through a managed callable wrapper (MCW) 44 that acts as a proxy for the unmanaged object 40. Managed wrappers appear to be like any other managed class to the managed client 38 but are utilized to marshal calls between managed and unmanaged code. Objects being referenced outside the managed environment will provide a single MCW 44 regardless of the number of references that exist on that object. This facilitates that a single object identity is shared between the MCW 44 and the unmanaged object 40. When the managed client 38 loads the unmanaged object 40, the MCW 44 is created and appears like a managed object to that client. The MCW 44 takes on one of two forms based on how the object was created.

When created as an early bound object (e.g., interfaces determined at compile time), the MCW 44 will be of a specific type and will implement the interfaces 42 the unmanaged object 40 implements. This new managed object may be utilized like other managed types. For example, objects may be caste to any of the interfaces that the object implements and methods can directly be called on those interfaces. Some interfaces on the unmanaged object may not be exposed to the managed class. These interfaces are consumed by the MCW 44 and are factored into a different form as will be described in more detail below.

It noted that the unmanaged environment 20 generally provides that unmanaged components implement certain interfaces such as IUnknown, IProvidedClassInfo, and provides for introspecting type information, through an ITypeInfo interface, for example. The UCW 30 exposes these interfaces via the bridging services 32. This is similar to what the MCW 44 provides for unmanaged components, by exposing Reflection interfaces, for example. Also certain classes of unmanaged components enable ITypeInfo to be extended at runtime by dynamically adding new methods and properties to the ITypeInfo. This can be achieved by exposing another interface ItypeInfoEx and enabling calls to newly added methods and properties through IDispatchEx interface, for example. Similarly, certain managed components enable an associated managed type to be expanded by implementing an IExpand interface, for example, via the bridging services 32.

Figure 2:
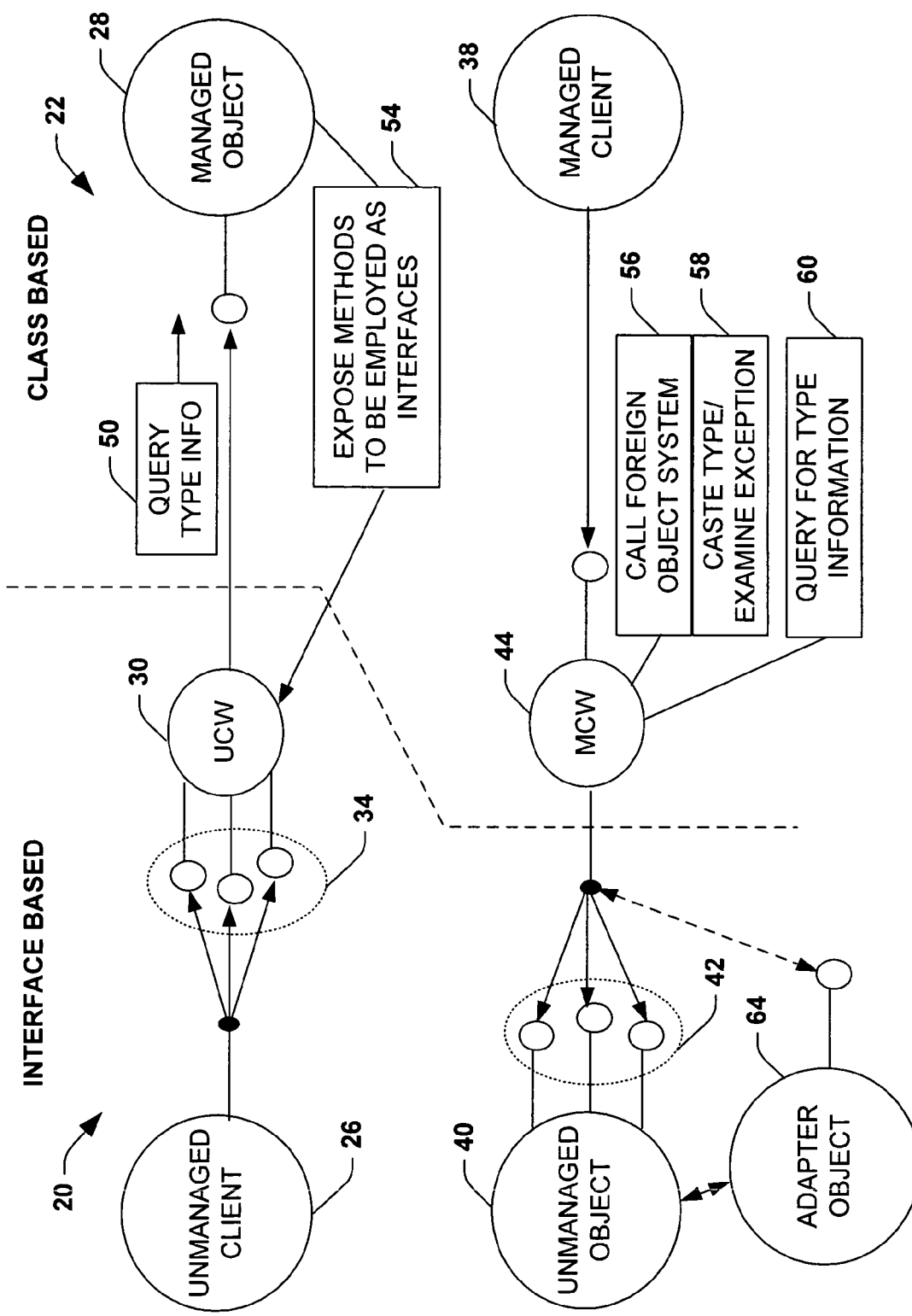
FIG. 2 is a schematic block diagram illustrating interface and class-based bridging in accordance with an aspect of the present invention.

Referring now to FIG. 2, bridging between an interfaced-based model in the unmanaged environment 20 and a class-based model in the managed environment 22 is illustrated in accordance with the present invention. When attempting to determine available interfaces 34, the UCW 30 queries for type information, depicted at reference numeral 50, from the managed object 28. In response to the query, the UCW 30 is exposed (e.g., pointers to underlying methods provided) to methods in the managed object 28 that are described in the managed object metadata (not shown), for example, as depicted at reference numeral 54. The methods that are retrieved by the UCW 30 are then utilized to form the unmanaged interfaces 34. When communicating from the managed environment 22 to the unmanaged environment 20, however, it is generally not possible to discover which interfaces may be implemented by the unmanaged client in advance. Therefore, the MCW 44 generally determines what types of interfaces may be provided by the unmanaged client 26 by examining responses to interface queries. For example, one possible method for determining the interfaces is to invoke an interface call on the unmanaged client 26 at reference numeral 56. Based on the information returned in the call, a caste is made of the type information returned from the call and an exception is examined that results from the caste at reference numeral 58. Based on the exception, an inference can be drawn about the interface employed. At reference numeral 60, a query may alternatively be directed by the MCW 44 to determine if the unmanaged object implements a specific interface of known type, wherein the interface 42 is then implemented in response to the query.

It is noted that some interfaces may not be mapped. For example, an interface pointer such as (void\*) or (byte\*) point to buffers of unknown sizes and shapes. In these cases, a developer may have to add some significance to the unknown pointer. For example, a pointer sized integer (PSI) could be declared by the unmanaged object 40, wherein the PSI is treated as an address that points to an array or buffer of known size. For obscure mappings of unknown size and type, an adapter object 64 may be provided to map unknown interface types from the unmanaged object 40 to known sizes and types recognizable by the MCW 44. The unmanaged wrappers 30 are created in order to expose an unmanaged interface 34 on a managed class. The unmanaged interface 34 that is exposed from the wrapper is a proxy for the actual interface that the object implements. The interfaces generated by the wrapper are generated dynamically, and as interfaces are requested, the wrapper accesses the class metadata to determine if the class implements the requested interface. If it does, the wrapper creates a new interface pointer table (e.g., vtable) for the interface and populates the pointer with pointers to stub functions that delegate the calls to the actual methods on the object. These tear-off interfaces are created if, and when, they are requested. This reduces the object overhead considerably for objects that implement many interfaces, such as a vtable, since the interfaces are only allocated if the interface is utilized.

At any given time, the UCW 30 may be proxying several different interfaces on the same managed object 28, wherein the UCW 30 generates the vtable and stubs as necessary. All interfaces explicitly implemented by a managed class can be exposed through the UCW 30 as a vtable-based unmanaged interface, for example. For backward compatibility with unmanaged objects, the actual layout of the vtable for the unmanaged interface 34 can be controlled through the class metadata although most unmanaged interfaces generally have the same layout as the managed interface. As described above, the function pointers in the vtable exposed by the UCW 30 do not actually point to the managed implementation of the method. Instead they point to stubs that marshal the call to the managed method. The stubs are responsible for marshaling the calls from the unmanaged code to managed code.

The MCW 44 also acts as a proxy for the interfaces exposed by the underlying unmanaged object 40. Some interfaces are consumed by the MCW 44 but not exposed through the MCW 44. The MCW class appears to implement all methods of all interfaces implemented by the class. This enables users of the MCW 44 to call methods directly on the class without having to cast to the proper interface before making the call. A user of an MCW 44 can cast from one interface implemented by the MCW 44 to another. Thus, the interface definition should be available, however, in order for the cast to succeed.

Figure 3:
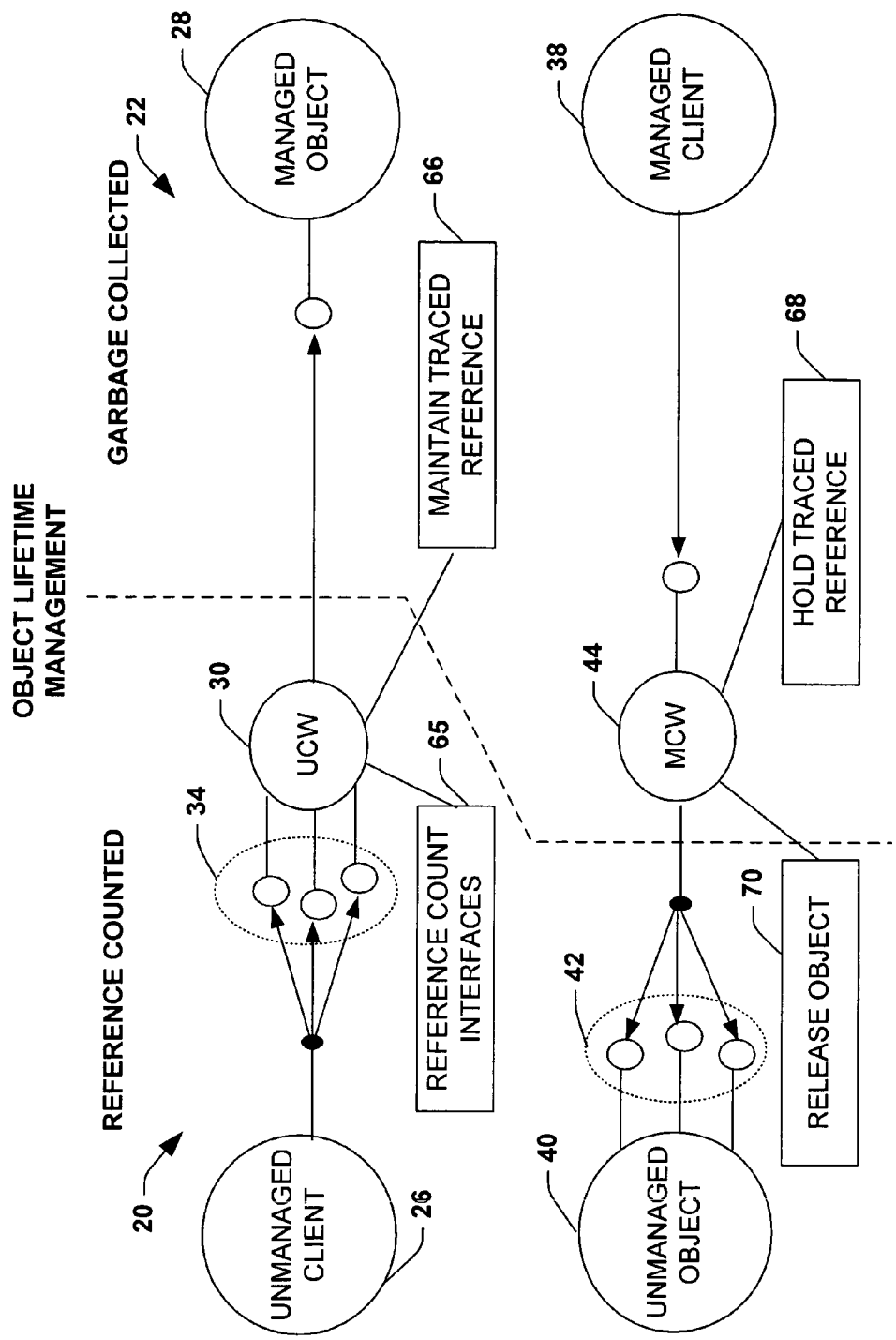
FIG. 3 is a schematic block diagram illustrating object lifetime management in accordance with an aspect of the present invention.

Turning now to FIG. 3 object lifetime management is illustrated in accordance with the present invention. As described above, reference counting is generally employed on the unmanaged side 20 whereas garbage collecting is generally employed on the managed side 22 when reclaiming objects from memory that is no longer being accessed from a client. Each unmanaged interface 34 that is returned from the UCW 30 is reference counted (e.g., increment counter when unmanaged client accesses managed object) and is depicted at reference numeral 65. The UCW 30 in turn maintains a traced reference, and is illustrated at reference numeral 66, for the managed object 28. In this manner, the UCW 30 can facilitate that the underlying managed object remains alive as long as unmanaged references exist on the UCW 30. The traced reference 66 also enables other managed objects to maintain a reference to the same managed object 28 as the UCW 30. Unlike unmanaged objects, however, managed objects do not have deterministic lifetimes. This implies that even though all reference to the UCW 30 have been released, there may be some time elapsed before the managed object 28 is actually freed as determined by the garbage collecting interval of the managed environment 22.

The MCW 44 is also responsible for keeping the unmanaged object 40 alive as long as the MCW is being accessed. The MCW 44 is garbage collected like other managed objects but internally holds a reference 68 on the unmanaged object it wraps. When the MCW 44 is garbage collected, a wrappers finalizer is called which, in turn, calls a Release( ) (e.g., decrement reference count) 70 on any interface pointers it's caching. Garbage collection for an MCW is triggered under the same circumstances as collection for a managed object thereby allowing managed clients to treat an unmanaged object like a managed object.

Under most circumstances, the scenario described above performs adequately, however, in some cases, other techniques may be employed. For example, the MCW 44 is automatically garbage collected when the last reference to the wrapper is destroyed. However, there are generally no guarantees about how long it will take for the MCW 44 to be collected. In fact, it may be some time before the MCW 44 is actually garbage collected. If the underlying unmanaged object 40 is holding resources opened (e.g., a database connection), object lifetime may be addressed by other techniques as the resources are left opened for prolonged periods. This situation may be referred to as non-deterministic finalization. One possibility for this situation is to take on responsibility and explicitly release references to the underlying unmanaged object 28. In the normal scenario, the MCW 44 releases all references to the unmanaged object 28 when the wrapper is garbage collected, however, a release service is provided by the bridging services described in FIG. 1 that can explicitly release the references rather than waiting for the garbage collector. This may be achieved by passing the MCW 44 to the bridging services, and forcing the wrapper to call Release (one time) on any interfaces the wrapper is currently caching.

Figure 4:
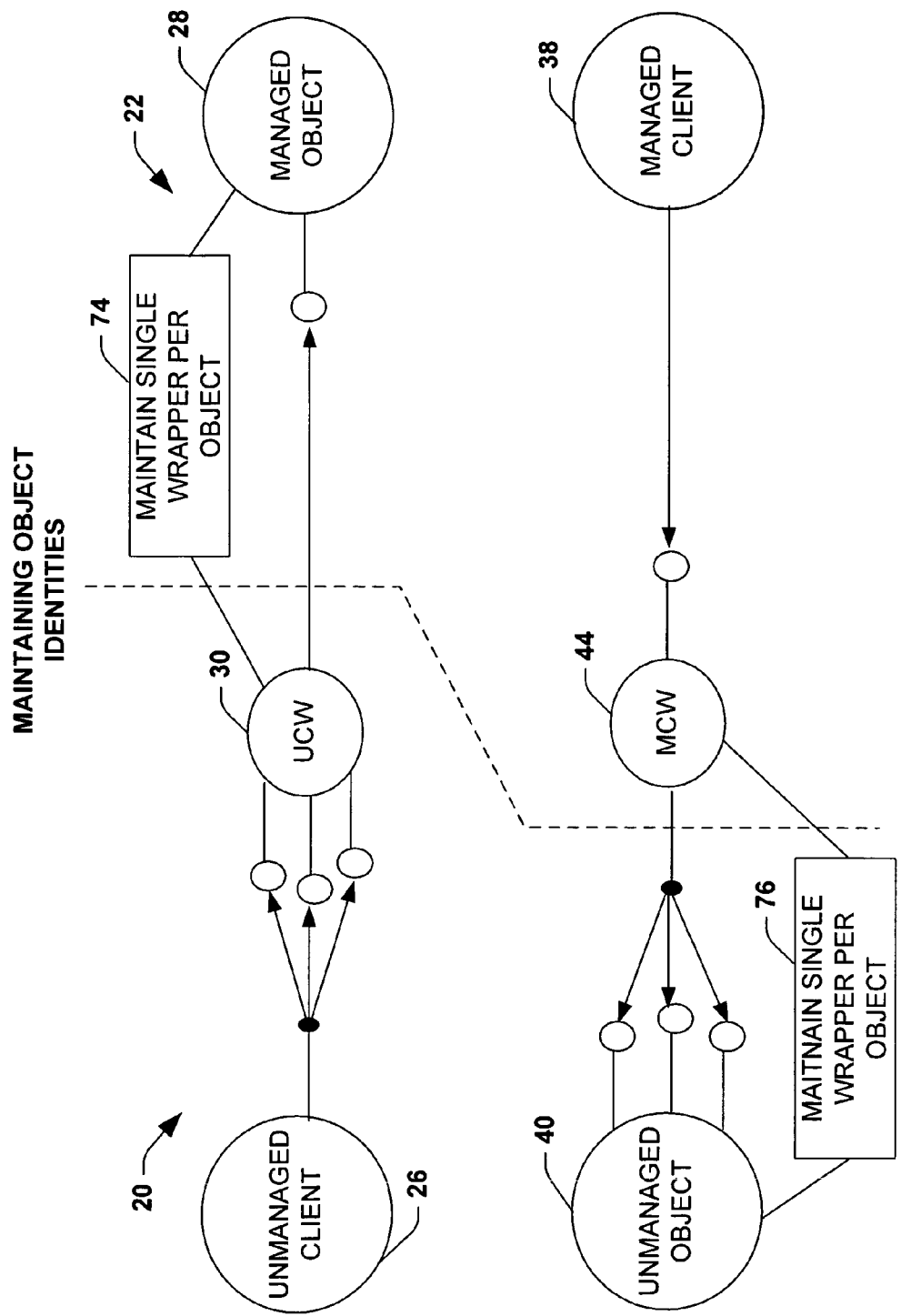
FIG. 4 is a schematic block diagram illustrating managing object identities in accordance with an aspect of the present invention.

Referring now to FIG. 4, bridging between object identities is illustrated in accordance with the present invention. In general, the unmanaged environment 20 maintains a "loose" notion of object identity as opposed to a "strict" notion of object identity in the managed environment 22. As an example, activation of the managed object is not the only way wrappers can be created. The UCW 30 may also be created as a side effect when one managed object returns a reference to another managed object from a method call (e.g., either as a return value or as an out parameter on a method call). In order to honor the unmanaged environments identity rules, it is generally important that only one wrapper exists 74 for a given managed object. This facilitates that all interfaces on the same object have a common IUnknown, for example. Therefore, when a UCW is needed, the managed environment checks for an existing wrapper on the managed object 28 before creating a new one. This determines that no more than one wrapper will exist for a given managed object.

In contrast, an individual MCW 44 may appear to implement several interfaces. When the MCW 44 is cast from one interface to another, internally the wrapper makes a matching QueryInterface call, for example, to the unmanaged object 40. If the Query succeeds, the returned interface is cached within the wrapper. All calls on the wrapper are thus delegated to the underlying object through interfaces it exposes. Regardless of whether the MCW 44 is created early bound, late bound, or even in response to a method call, there generally will not be more than one instance 76 of the MCW 44 for each instance of the underlying unmanaged object 40. The MCW 44 preserves the identity of the underlying unmanaged object 40 by comparing the objects IUnknown interface to determine whether the same object is exposing two different interfaces. Therefore, each MCW 44 wraps a unique IUnknown interface, for example.

In some cases, the wrapper to object identities described above may be too restrictive for some applications. For example, when unmanaged interfaces are brought into the managed environment, the default is to maintain a single identity, wherein all references to the managed client are directed through the same managed wrapper. In accordance with the present invention, these identity rules may be bypassed. For example, a plurality of interfaces and methods may be brought into the managed environment and associated with a managed class. The managed class may then be "subtyped" off of in order to create a stronger notion of a managed class. This may be achieved by mapping the unmanaged interfaces to a generic class and instantiating another more specialized wrapper or wrappers from the generic class thereby providing more consistency in the managed environment when interfacing to an unmanaged object 40 through the more specialized wrapper.

Figure 5:
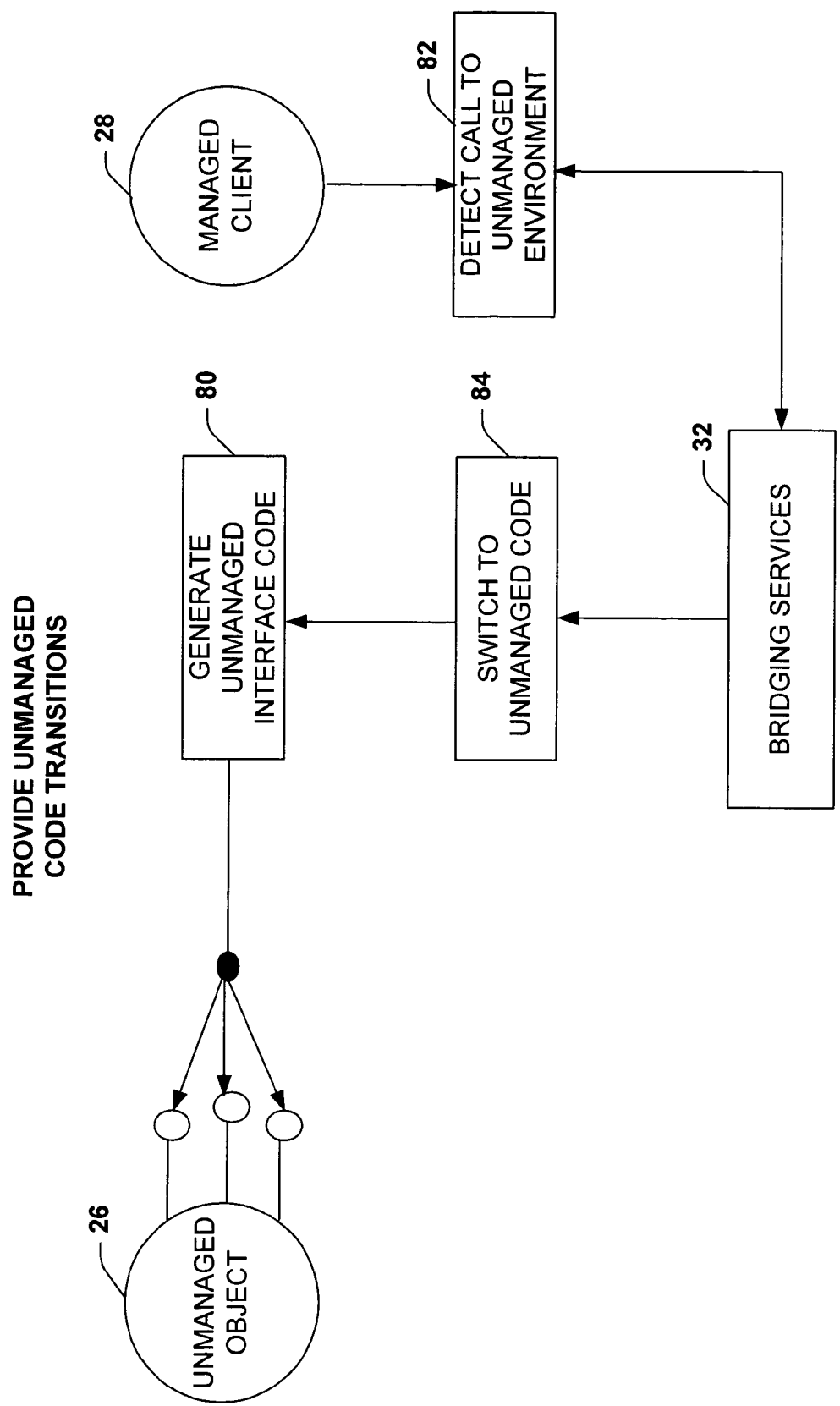
FIG. 5 is a schematic block diagram illustrating unmanaged code transitions in accordance with an aspect of the present invention.

Referring now to FIG. 5 code transitions to and from unmanaged code is illustrated in accordance with an aspect of the present invention. As described above, wrappers are generally provided to bridge between different object systems. However, in some circumstances, code developers may desire to generate unmanaged code with associated interfaces from the managed environment 22. This may be achieved by utilizing a compiler that generates unmanaged code and associated unmanaged interfaces, for example. This is illustrated in FIG. 5, wherein at block 80, an unmanaged code and interface is generated and resides in the managed environment. At block 82, calls are detected to the unmanaged environment via the bridging services component 32. This may be achieved detecting unmanaged calls from the managed client 28 such as detecting calls made to an unmanaged vtable reference, for example. When a call is made to the unmanaged environment, the bridging component 32 switches all interface calls at block 84 from the managed client 28 to the unmanaged code at block 80. In effect, the interface calls to unmanaged code happen outside of the managed environment. In this manner, code developers may write custom interfaces without interaction from the managed environment and may tailor applications to specific performance requirements.

Figure 6:
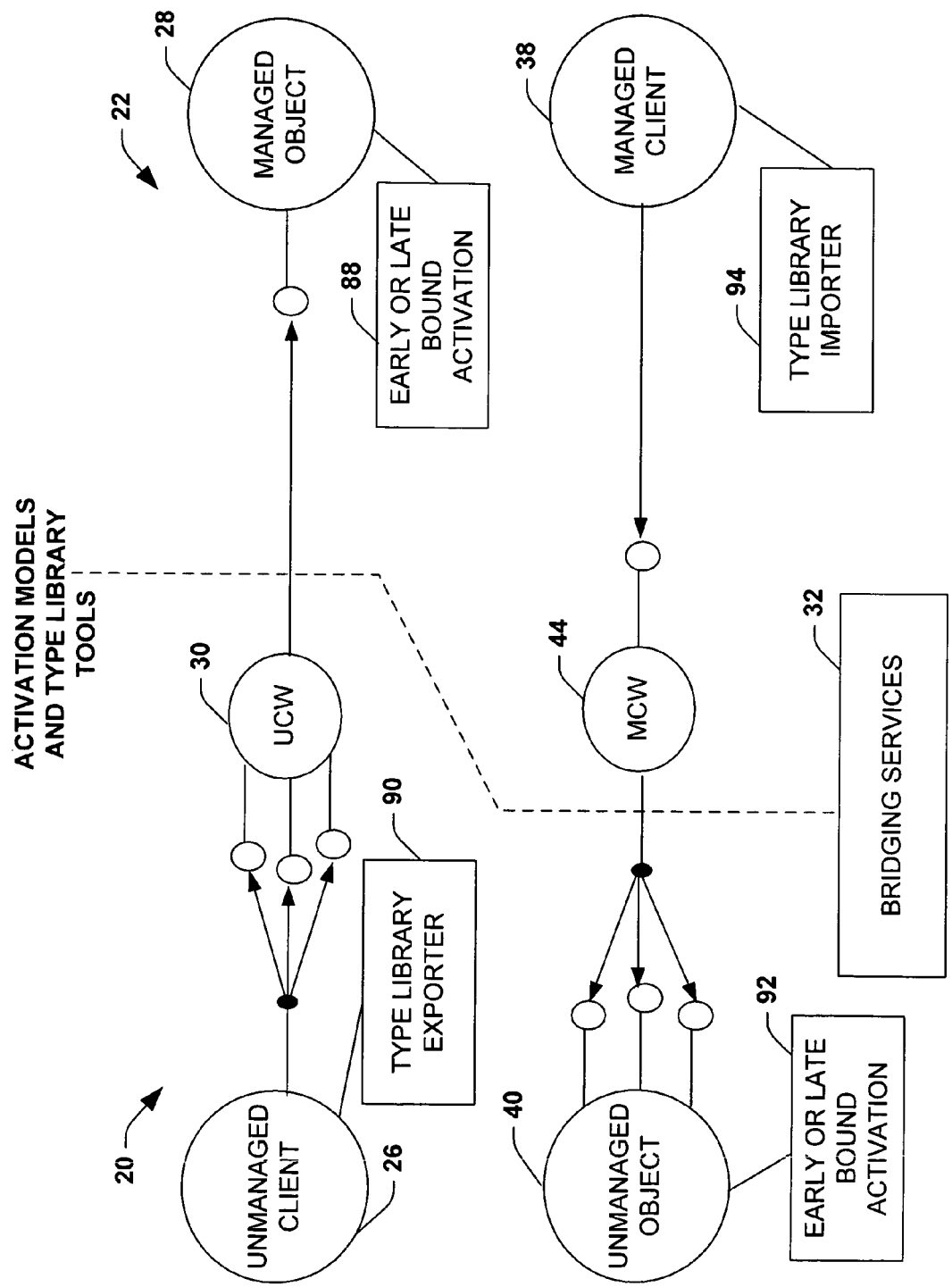
FIG. 6 is a schematic block diagram illustrating activation models and library tools in accordance with an aspect of the present invention.

Referring now to FIG. 6, type library converters and foreign object activation techniques are illustrated in accordance with the present invention. Unmanaged applications can bind to managed classes in either an early bound or late bound manner as depicted at reference numeral 88. Late binding in this context refers to using an interface such as an IDispatch interface exposed by the unmanaged object 26 at run time. Early binding (also referred to as v-table binding) implies binding through an interface other than IDispatch. For example, early binding utilizes compile time type information while late binding does not. The managed environment 22 generates managed type information in the form of an unmanaged type library (not shown) for unmanaged applications to bind to. The type libraries generated can then be imported into most development tools to provide complete compile-time type information about managed object types. The unmanaged type library can be generated by converting metadata, for example, within a managed assembly.

Unmanaged clients 26 are free to bind to managed object types employing standard late binding techniques such as IDispatch. Managed types are thus adapted to support IDispatch or other late binding techniques without having to provide any additional code. The IDispatch implementation is provided by the managed environment 22 by examining the metadata for the managed type. Under some circumstances, the managed environment 22 may require a type library in order to provide a custom or particular implementation of IDispatch.

A static type library may also be generated dynamically by describing the types defined in a managed assembly and can be generated in two ways. A Type library export utility 90 may be provided to retrieve and convert type information from the managed environment. Alternatively, the bridging services component 32 may be configured to provided type information dynamically. These tools convert managed assemblies to unmanaged type libraries. During the conversion, certain transformations are made. Because type libraries may not accommodate all the information found in assemblies, some data may be discarded.

Managed interfaces are exported from managed type libraries as unmanaged interfaces. The interfaces have the same methods and properties as the managed view of the interface but the method signatures differ considerably. For example, unmanaged interfaces may be identified by an ID. Thus, a managed interface can be assigned a fixed IID by attributing the interface definitions with a GuidAttribute, for example. If the interface is not attributed with the attribute, the IID is automatically assigned by default when the type library is exported. The assigned IID is based on the interface name (including namespace) as well as a complete signature of all the methods defined within the interface. This facilitates that any changes made to the interface result in a new IID being defined if the interface definition is re-exported. Reordering the methods, changing their argument types or return type may affect the IID generated. Changes to method names do not affect the generated IID.

Interfaces that are not attributed with a fixed ID can still be still be requested through a managed adaptation of QueryInterface, for example. For example, a QueryInterface will operate for both fixed interface IID's as well as generated IID's. Generated IID's are thus not persisted within the metadata for the type. By default, all managed interfaces may be exported as dual interfaces deriving from IDispatch. The InterfaceTypeAttribute can be applied to an interface to indicate that the interface should be an IUnknown (non-dispatch) derived interface, a dispatch-only interface, or a dual interface, for example.

Managed applications can bind to unmanaged classes in an early or late bound fashion as depicted at reference numeral 92. Early binding utilizes type information for the unmanaged class at compile-time and employs the underlying unmanaged class to support early binding as well. Early bound instances are typically created with a new operator and members are accessed directly through the object instance. In contrast, instances of unmanaged objects can be created utilizing a CoCreate instance operator. It is noted that object instances can be automatically activated by employing "new" on the managed side and CoCreate instance on the unmanaged side. This can be achieved by mapping GUID's associated with the instance on the unmanaged side to type information contained within metadata fields on the managed side, for example. In contrast, unmanaged instances may be activated on the managed side by mapping type information to GUID's on the unmanaged side. If a more specialized activation method is desired, developers can invoke customized activation methods (e.g., write specialized code to activate foreign object) via the bridging services component 32 in order to bypass CoCreate instance, for example.

When early binding isn't desirable, unmanaged classes can also be created in a late bound fashion. Late bound references do not require a type library for the unmanaged class although late binding is available to classes that do have metadata. Late bound instances are created and their members are accessed through reflection API's within the managed environment, for example. Thus, unmanaged classes that only support late binding through IDispatch, for example, are generally only accessible through reflection from within managed code.

In order to early bind to an unmanaged class or interface, a managed metadata definition of that class or interface should be available. The metadata definition of the unmanaged type is what managed clients bind against at compile time. The managed environment also employs the metadata definition to generate the MCW 44 that will wrap an instance of the unmanaged object at execution time. The metadata should be available at both compile time and at execution time. The metadata for an unmanaged type is generally not different than the metadata for other managed types. Similar API's may be employed to generate the metadata (e.g., IMetadataEmit or ReflectionEmit). A compiler utilizing either API could generate similar metadata, for example. The types defined in the metadata are generally not different than types that would be found in any managed program other than a few flags that are set to indicate that the type is an unmanaged type.

The metadata can be generated in various ways. Generally, it's generated from an existing type library that describes the unmanaged types although it doesn't have to be. Once generated, the metadata may be persisted to a file or it may be utilized once and discarded. A managed metadata definition of an unmanaged type can be generated by:

1. Converting an existing type library.

2. Compiling a source code definition of the type using a compatible compiler.

A common technique is to start with an unmanaged type library and a utility such as a type library importer 94 to convert the unmanaged type to managed metadata. There also may be an API exposed by the managed environment that does the same thing but is more is suitable for use from within a development environment. The other option of describing the type in source does not require a type library to start with but is a more advanced technique. Given an existing type library there are two techniques for converting a type library file to metadata. The first technique is to use the type library importer 94 to do the conversion. Another option is to use a type library converter class within the bridging services component 32 to do the conversion. Both techniques are essentially the same; the output is identical. The type library importer—is responsible for converting the type definitions found within an unmanaged type library into equivalent definitions in a managed assembly. Conversions may be achieved for an entire type library at one time.

Figure 7:
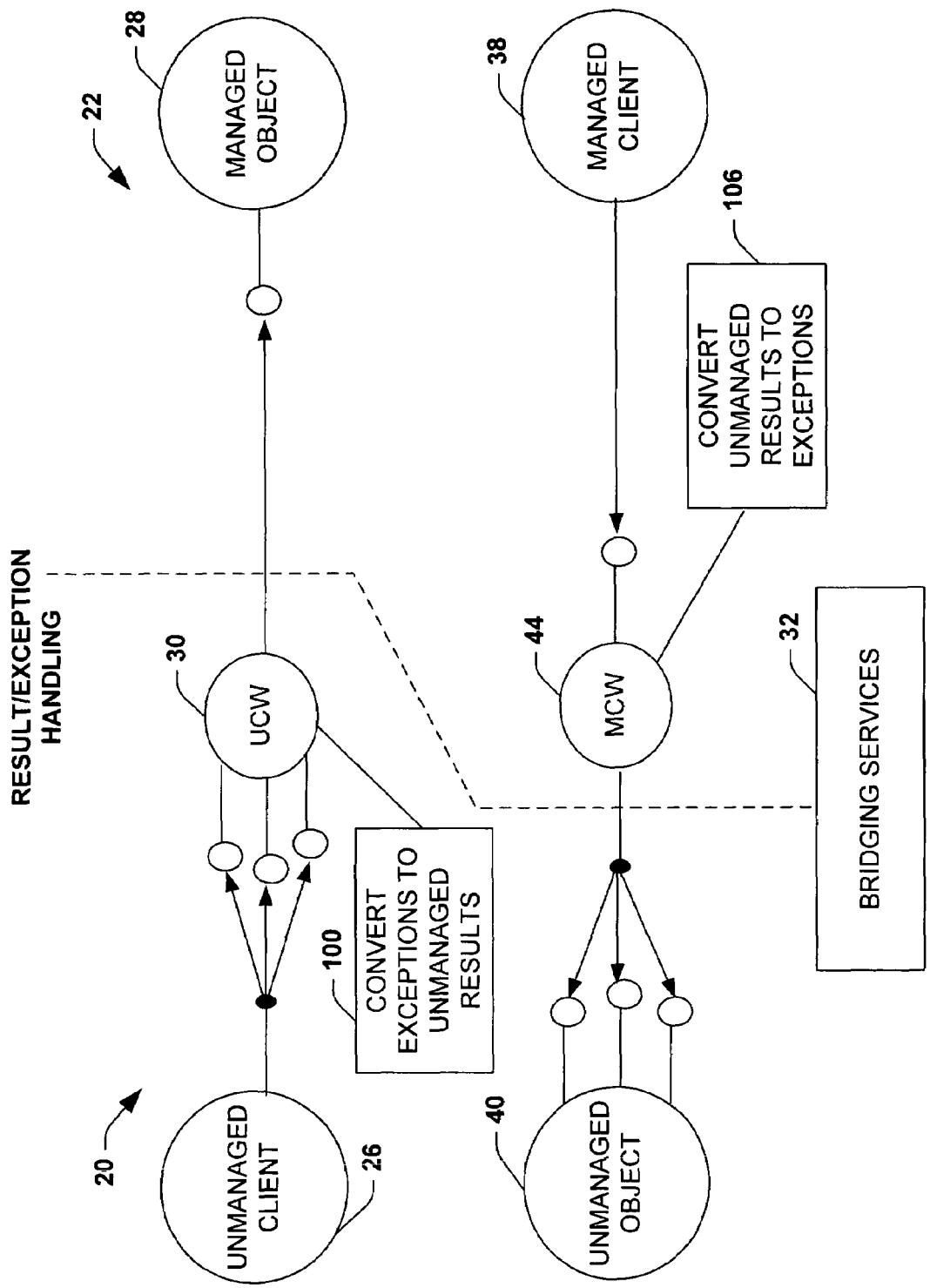
FIG. 7 is a schematic block diagram illustrating result and exception handling in accordance with an aspect of the present invention.

Turning now to FIG. 7, result and exception handling between managed and unmanaged object systems are illustrated in accordance with the present invention. In general, the unmanaged environment 20 returns results (e.g., error/success codes) on substantially all interactions with unmanaged objects and clients, whereas the managed environment 22 will generate an exception (e.g., system interrupt) in the event an error has occurred in communicating with a managed object. The present invention provides a mapping between unmanaged results and managed exceptions. Unmanaged interfaces generally return results (e.g., HRESULTS) to convey error information to a caller. Managed environments introduce the ability to throw exceptions across object interfaces from one managed object to another. When unmanaged clients are accessing managed objects, a stub is provided to maintain result semantics that unmanaged clients are expecting. Therefore, exceptions that occur during calls made by unmanaged clients are mapped to the equivalent results 100 and returned to the unmanaged client. Likewise, results generated in the unmanaged environment 20 are mapped into exceptions 106 in the managed environment 20.

It is noted that the unmanaged environment generally utilizes HRESULTs and IErrorInfo to convey error information. For example, the unmanaged environment can provide an API such as GetErrorInfo(IErrorInfo**pErrInfo) which would return the last IErrorInfo that was setup on a thread. Thus, an unmanaged function if it returns a failure HRESULT, may call SetErrorInfo(pErrorInfo) to setup an IerrorInfo with details about the error. The UCW 30 exposes this IErrorInfo interface automatically on all classes that derive from a base Exception class. When a call passes through the UCW 30 and results in an exception, for example, the bridging services 32 can trap the exception and calls SetErrorInfo(pErrorInfo) by creating an IErrorInfo on top of the thrown exception. Similarly, when calls through the MCW 44 return a failure HRESULT, the bridging services 32 calls GetErrorInfo to get the IErrorInfo and converts this to an exception object that can be thrown.

It is further noted that if the following scenario were to occur:

(M1) managed→(U1)unmanaged→(M2) managed, wherein (M1) represents a managed exception thrown, causing an unmanaged HRESULT (U1), resulting in a managed exception (M2). An exception object thrown in (M2) passes through (U1) and if (U1) passes the IErrorInfo without alteration, then in (M1), the IErrorInfo maps back to the same exception object that is thrown in M1. Similarly, if:

(U1) unmanaged→(M1)managed→(U2) unmanaged,

The IErrorInfo setup in (U2) can be the same IErrorInfo that (U1) will receive, provided (M1) doesn't alter the exception that was created out of the IErrorInfo.

As an example, given the following type library description of an IFoo interface:

public interface IFoo : IDispatch
{
    HRESULT StartWork( );
    HRESULT GetCount([out, retval] long *lCount)
}

A managed developer may implement the interface as follows public class CFoo : public IFoo {
    void StartWork( )
    {
        if ( . . . ) throw ManagedException

```
}
   long GetCount( )
   {
      if ( . . . ) throw ManagedException
   }
}
```

In the managed environment, the methods that return results are thus replaced by methods that throw managed exceptions. In this case, if a managed client 38 uses the CFoo class, for example, it can catch the exceptions thrown in CFoo::StartWork and CFoo::GetCount in a standard manner. However, if the same class is utilized by an unmanaged client 26, the stub catches the exception thrown by the class and returns the result to the caller. If the method executes without throwing an exception, the stub returns an OK flag. Thus, the managed environment utilizes a mapping between exceptions and results. The class System.Exception, for example, has a protected member called result for storing an unmanaged result. All existing class library exception classes are automatically initialized with a result. Some managed exceptions map to existing results. For example, an OutOfMemoryException maps to an HRESULT COR_E_OUTOFMEMORY, which is equivalent to E_OUTOFMEMORY. Most managed Exceptions map to new result values, however. For example, user defined classes that extend System.Exception also set the result field during construction. If the result field is not reinitialized in a sub-class then the result will have the value assigned by the base exception class. New exception classes can be mapped to an existing result by supplying the result value in the exception's constructor. For example, a new exception class called NoAccessException can be created and mapped to the HRESULT E_ACCESSDENIED with the following code:

```
public class NoAccessException : public ApplicationException
{
   void         NoAccessException(         )
{HRESULT=E_ACCESSDENIED;}
} void class CMyClass {
{
   public void MethodThatThrows( ) {
   NoAccessException e=new NoAccessException( );
   throw e;
   }
}
```

Alternatively, a method Marshal.ThrowExceptionForHR (int HRESULT), for example, can be utilized to throw an exception with a specific result value. ThrowExceptionForHR can lookup the result in a table and throw the appropriate exception type for the given result. In the example below, an ArgumentException would be thrown.

```
void class CMyClass {
   public void MethodThatThrows( )
   {
   Marshal.ThrowExceptionForHR(COR_E_ARGUMENT);
   }
}
```

Additional information about the exception is provided to the client through the IErrorInfo interface that it also exposed by the wrapper.

Success Results—Unmanaged clients also support the notion of success results that can be returned from any unmanaged method to convey information to the caller rather than indicate and error condition. Examples include S_FALSE and DB_S_ENDOFROWSET. The technique described above (mapping exceptions to results) generally does not support success results mainly because the managed environment does not employ exceptions for reporting non-exceptional situations (like a FalseException or EndOfRowsetException). Methods that need to return success results can employ a PreserveSigAttribute, for example. Applying the attribute to a method indicates that the method should not undergo an exception to result conversion performed by a marshaller. Instead, the signature of the managed method is exposed to unmanaged clients in the same way it is exposed to managed clients. For example, the method shown below:

[System.Runtime.InteropServices.PreserveSig]

public ulong MethodThatReturnsHResult( )

{ return S_FALSE;

} would be exported to a type library as:

ulong MethodThatReturnsHRESULT( );

Return values from managed methods are handled through [out, retval]parameters added to an unmanaged signature of the method. A managed method that is defined with a void return, for example, generally has no [out, retval] parameter. A managed method with an int return type would have an [out, retval] int * parameter added to the unmanaged method signature. Return values may also need to be converted from a managed type to an unmanaged type. For example, the following method returns a System.String that is converted to a BSTR in the unmanaged Signature.

Figure 8:
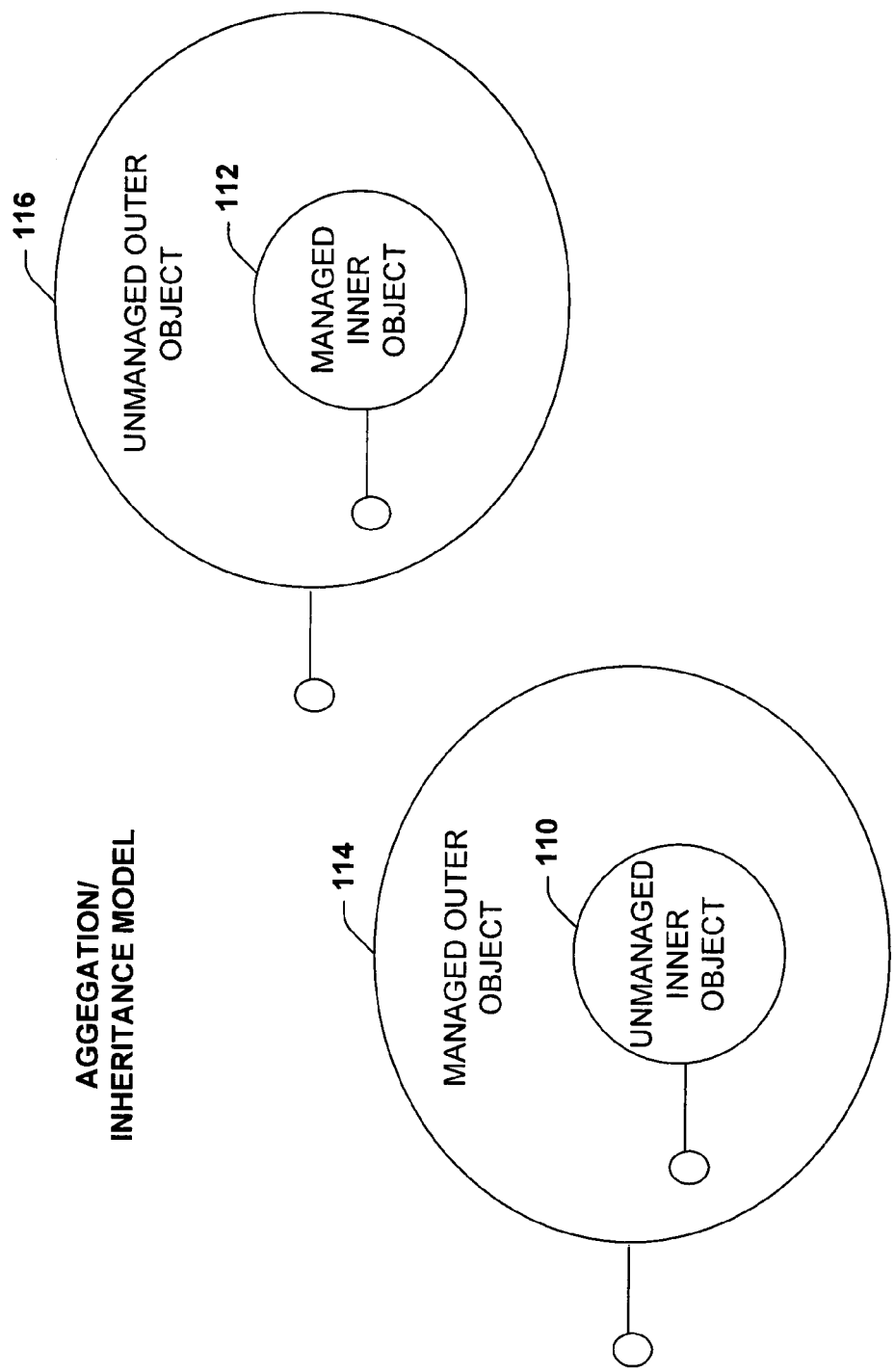
FIG. 8 is a schematic block diagram illustrating an aggregation and inheritance model in accordance with an aspect of the present invention.

Managed signature:

System.String GetName( );

Unmanaged signature:

HRESULT GetName([out, retval] BSTR *rv);

Turning now to FIG. 8, a re-usability model is illustrated in accordance with an aspect of the present invention. In a managed environment, object re-use is generally provided by implementation inheritance, whereas in an unmanaged environment, the notion of re-use may be described in terms of delegation, aggregation and interface inheritance. As illustrated, this may be achieved, by enabling managed or unmanaged inner objects 110 and 112 to expose interfaces to managed or unmanaged outer objects 114 and 116. Thus, a single identity for the aggregate of the inner and outer objects is maintained that is defined by the identity of the outer objects 114 and 116. Un managed reusability is achieved through containment and aggregation. Managed objects can participate in both models as the inner object in the relationship as described below. When it's desirable for the managed object to be the outer object, the managed environment provides inheritance.

One requirement for managed objects to support aggregation or containment is that the type should be public and should have a public default constructor. Meeting both these requirements enables the object to be creatable, which is generally necessary for both containment and aggregation of the object. Containment is generally a simpler of the two re-use models and is supported by managed objects. Containment is generally employed when the outer object 114, 116 needs to modify the behavior of the inner object 110, 112. To do so, the outer object creates an instance of the inner object during construction and delegates calls to the inner object as necessary. The outer object can select which calls to delegate and which calls to handle. There are no special requirements for the managed environment in order for objects to support containment.

Aggregation is slightly more involved than containment. Aggregation is employed when the outer object wants to expose another objects implementation of an interface without modification. Managed objects typically are adapted to support unmanaged style aggregation with the managed object being employed as the inner object (or aggregatee). For example, in order to aggregate a managed object, the unmanaged outer object creates the managed inner object by calling CoCreateInstance passing the outer object's IUnknown as a OuterUnknown parameter. When an outer IUnknown is passed to a managed object during construction, the managed object caches the interface and utilizes it as follows:

The outer IUnknown is not reference counted since the inner objects life is scoped within the lifetime of the outer object.

If the inner object is queried for an interface that it does not support, the inner object delegates the call to the outer objects IUnknown interface.

All calls to the inner objects AddRef and Release methods are delegated to the outer objects IUnknown.

These three behaviors make it possible to aggregate any managed object. With this type of aggregation relationship, it's possible to have a single unmanaged object that is partly implemented in managed code (the inner portion) and partly in unmanaged code (the outer portion).

When managed interfaces are exposed to unmanaged environments, the managed interfaces generally extend IUnknown or Idispatch, for example, even when the interface is inherited from another interface on the managed side. The same applies for the class interface that's generated for managed classes.

The unmanaged model for reusability is containment and aggregation. The managed environment adds the ability to employ implementation inheritance. Also, managed types that derive from an unmanaged object's MCW may be employed. The managed type can then expose the method and properties of the unmanaged object as well as methods and properties implemented in managed code. The result is an object that is partly implemented in managed code and partly implemented in unmanaged code sometime referred to as a mixed-mode object. To achieve this, there are generally three requirements that the base, unmanaged type must satisfy. These requirements include:

There should be metadata that defines the unmanaged type.
    The type should be creatable.
    The type should be aggregatable (in the unmanaged sense).

If the above requirements are met, a managed type can then extend the MCW for that unmanaged type and override the methods provided by the base object. The inheritance is done similarly as it would if the base object were managed.

Figure 9:
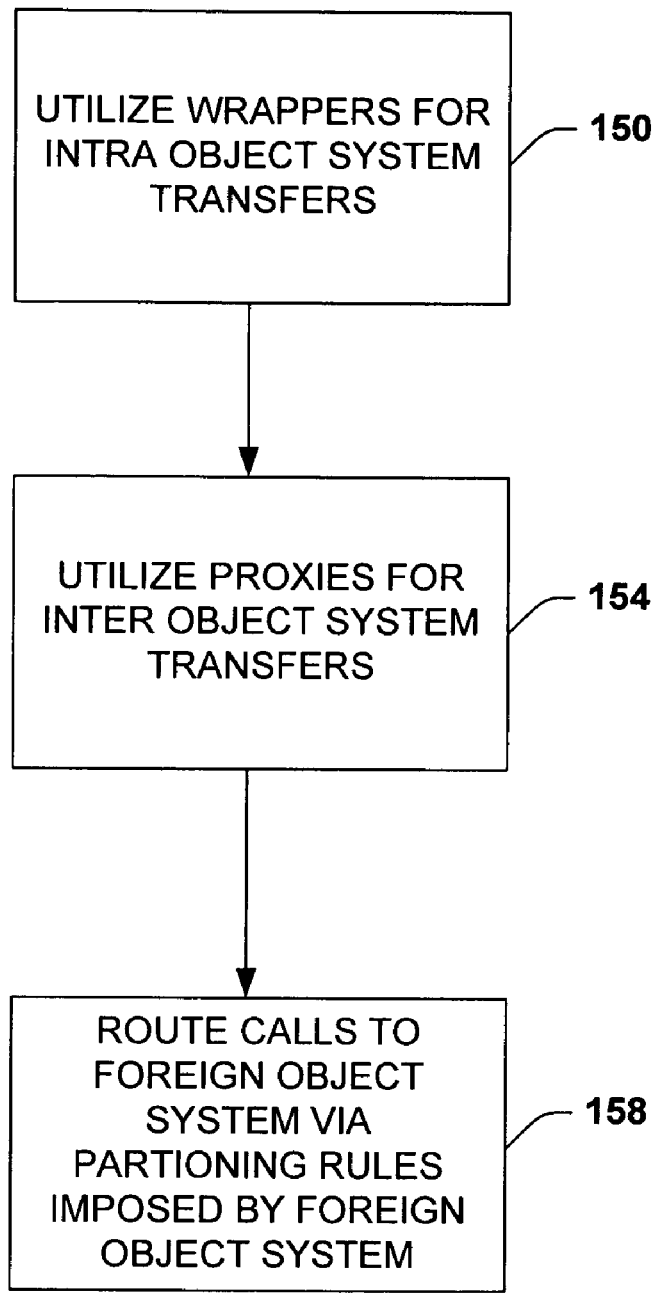
FIG. 9 is a flow chart diagram illustrating a methodology for communicating across partitions in accordance with an aspect of the present invention.

FIG. 9 illustrates a methodology managing contexts and partitions in accordance in accordance with an aspect of the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other blocks from that shown and described herein. For example, those skilled in the art will understand and appreciate that a methodology could alternatively be represented as a series of interrelated states, such as in a state diagram. Moreover, not all illustrated acts may be required to implement a methodology in accordance with an aspect of the present invention.

As a general concept, each object system may be partitioned according to particular rule sets and architectures. For example, unmanaged object systems may be partitioned according to particular execution threads and related apartments. In the unmanaged environment, the object execution environment may be partitioned according to a particular operating context within the managed environment. The following methodology describes a process for operating within the rules established for a particular object execution environment.

Referring to FIG. 9, and proceeding to act 150, wrappers are utilized when transferring data from one object system to another. At 154, proxies provided within the wrappers provided at 150 are utilized to transfer information between objects in the same object system. At 158, calls are routed to the foreign object system according to the rules provided by the foreign object system. For example, calls routed to an unmanaged object are checked to determine whether the origin of the call is consistent with object threads and/or apartments established in the unmanaged object system. Calls routed to managed object systems may be checked against managed partitioning and context rules, for example.

As an example, managed environments generally do not utilize apartments to synchronize access to managed resources. Managed objects themselves are thus responsible to facilitate that shared object resources are utilized in a "thread safe" manner. The managed environment provides several techniques for protecting access to shared resources such as synchronized regions, synchronization primitives such as mutexes, locks and completion ports and synchronized contexts. When utilizing unmanaged services however, developers generally need to account for the threading characteristics of the unmanaged classes being utilized in order to develop efficient code. For example, unmanaged clients/objects may employ apartments to facilitate that all objects are employed in a "thread safe" manner. Most unmanaged objects are designed to live in single threaded apartments while other objects are built for multithreaded apartments.

Some object can operate in either type of apartments, wherein classes indicate the type of apartment through the system registry, for example. If the apartment model of the object and the thread calling the object are compatible, unmanaged objects enable calls on the object to be made directly by the calling thread. If the apartments are incompatible, unmanaged objects creates a compatible apartment and marshals all calls through a proxy in the new apartment. Calling through the proxy may add overhead to the call and can thus affect performance. Calling through a proxy also generally requires the object to have a registered proxy and stub or a registered type library if the types are compatible and type library marshaling is to be employed.

Since managed objects generally do not utilize apartments, managed threads typically do not initialize an unmanaged apartment unless and until the thread calls an unmanaged object. When a call is first made from managed code to unmanaged code, CoInitializeEx is called, for example, to initialize the unmanaged apartment as either an MTA or an STA apartment. The type of apartment created can be controlled by setting the threads ApartmentState field. The ApartmentState generally is set before any calls to unmanaged objects are made. If the Thread.ApartmentState field is set to ApartmentState.MTA or ApartmentState.Unknown, CoInitializeEx(NULL, COINIT_MULTITHREADED) is called just before the call is made. If the Thread.ApartmentState field is set to ApartmentState.STA, CoIntializeEx(NULL, COINIT_APARTMENTTHREADED) is called just before the call is made, for example. Unless set otherwise, the ApartmentState of managed threads is ApartmentState.Unknown and CoInitializeEx(NULL, COINIT_MULTITHREADED) is called.

To avoid calling through a proxy to access apartment threaded objects, managed threads can set the ApartmentState of the thread before the first call is made. For example, the following code demonstrates how an apartment threaded unmanaged object can be accessed from managed code. Since the object and the managed thread are in incompatible apartments, all calls on the object are thus made through an unmanaged created proxy.

using System.Threading;
using APTOBJLib;
...
AptSimple obj=new AptSimple ( );
obj.Counter=1;

By setting the threads ApartmentState before the object is created, the proxy can be eliminated and performance can be enhanced.

using System.Threading;
using APTOBJLib;
...
Thread.CurrentThread.ApartmentState=ApartmentState.STA;
AptSimple obj=new AptSimple ( );
obj.Counter=1;

A given thread can initialize an unmanaged apartment once. The apartment is initialized before the very first call is made into unmanaged code on that thread and therefore the ApartmentState should be set as early as possible. Changing the ApartmentState after the apartment has been initialized, generally has no effect. Apartments cannot be un-initialized or re-initialized. In some situations, the thread may have already made calls into unmanaged code before the ApartmentState could be set. In those scenarios, there is generally no way of changing the apartment type after the thread is initialized. An alternative is to create a new thread.

Managed systems generally include AppDomains that may be considered light-weight boundaries (similar to processes) within managed code, and can be created and unloaded. Unmanaged systems typically do not have knowledge of AppDomains. Thus, the UCW wraps this detail from the unmanaged system. When calls come through the UCW, however, the UCW checks the AppDomain of the thread and the AppDomain of the managed object, and facilitates suitable transitions to enter the managed domain. This is similar to what the MCW does for Apartments in the unmanaged system.

It is noted that data marshalling between object systems is employed when communicating and bridging between object systems. This generally includes converting type information from one object system to the other object system's type within the wrappers. As an example, type conversion may be applied to method parameters. In general, integer and floating point data types may be marshaled without conversion, however, other types such as strings may be converted to the managed classes that represent those types.

Unmanaged environments typically provide defined interfaces for certain operations,
such as,
(A) Stream and storage manipulation, IStream, Istorage interfaces, for example.
(B) Browse and access properties, IPropertySet, IpropertyBag, for example.
(C) Enumerate collections, IenumVariant, for example.
(D) Serialize an object state, IpersistStream, for example.

Managed environments may similarly provide:
(A) Stream manipulation, StreamReader, StreamWriter, Stream and File classes, for example.
(B) Properties.
(C) Enumerate collections, ICollection, Ienumerator, for example.

The UCW and MCW automatically map these interfaces. Also, metadata and typelib converters, described above provide suitable morphing during conversion and mapping.

Mapping between Events in the managed environment and an IConnectionPoint/IConnectionPointContainer model in the unmanaged environment is provided in accordance with the present invention. The unmanaged environment provides a design for how one or more Controls communicate to each other and with a Container. This can be achieved utilizing IConnectionPoint and IconnectionPointContainer interfaces, for example. Managed environments provide a different design utilizing delegates and Event classes, for example. The bridging service automates this mapping by exposing suitable interfaces and delegates through the MCW and UCW and the converters handle this conversion in the metadata/typelibrary. Furthermore, the bridging service is extensible, by enabling developers to "tweak" the data types that are marshalled as calls passed through the UCW and MCW.

A set of attributes may be provided that enable data types in the managed environment to be marshalled as specific data types in the unmanaged environment. There can be additional attributes that enable users to build custom marshallers which can take an input argument and provide back a converted argument as desired to pass through the boundary between managed and unmanaged environments.

Figure 10:
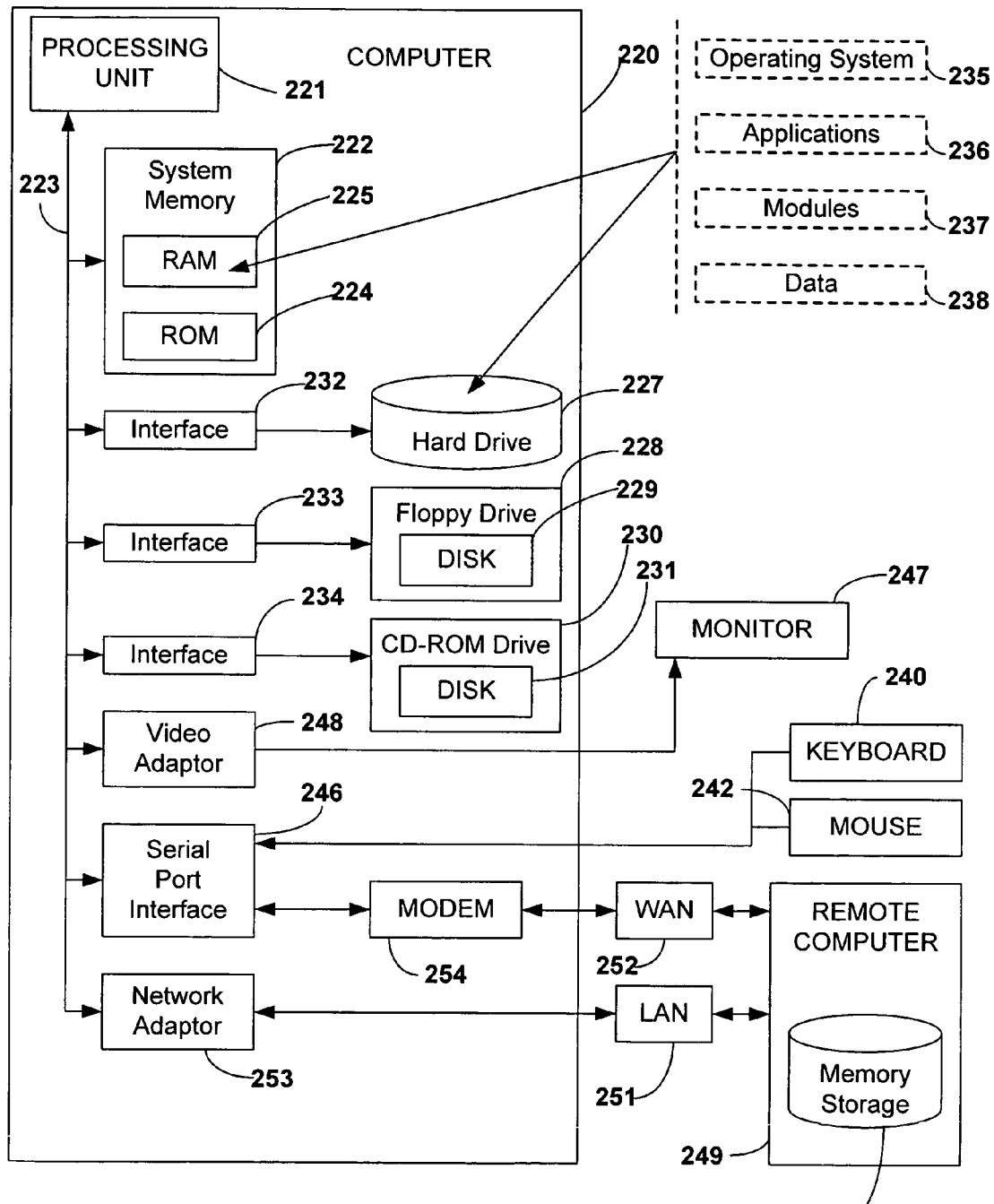
FIG. 10 is a schematic block diagram illustrating a suitable operating environment in accordance with an aspect of the present invention.

In order to provide a context for the various aspects of the invention, FIG. 10 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, handheld computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 10, an exemplary system for implementing the various aspects of the invention includes a conventional computer 220, including a processing unit 221, a system memory 222, and a system bus 223 that couples various system components including the system memory to the processing unit 221. The processing unit 221 may be any of various commercially available processors. It is to be appreciated that dual microprocessors and other multi-processor architectures also may be employed as the processing unit 221.

The system bus may be any of several types of bus structure including a memory bus or memory controller, a peripheral bus, and a local bus using any of a variety of commercially available bus architectures. The system memory may include read only memory (ROM) 224 and random access memory (RAM) 225. A basic input/output system (BIOS), containing the basic routines that help to transfer information between elements within the computer 220, such as during start-up, is stored in ROM 224.

The computer 220 further includes a hard disk drive 227, a magnetic disk drive 228, e.g., to read from or write to a removable disk 229, and an optical disk drive 230, e.g., for reading from or writing to a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage of data, data structures, computer-executable instructions, etc. for the computer 220. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 225, including an operating system 235, one or more application programs 236, other program modules 237, and program data 238. It is noted that the operating system 235 in the illustrated computer may be substantially any suitable operating system.

A user may enter commands and information into the computer 220 through a keyboard 240 and a pointing device, such as a mouse 242. Other input devices (not shown) may include a microphone, a joystick, a game pad, a satellite dish, a scanner, or the like. These and other input devices are often connected to the processing unit 221 through a serial port interface 246 that is coupled to the system bus, but may be connected by other interfaces, such as a parallel port, a game port or a universal serial bus (USB). A monitor 247 or other type of display device is also connected to the system bus 223 via an interface, such as a video adapter 248. In addition to the monitor, computers typically include other peripheral output devices (not shown), such as speakers and printers.

The computer 220 may operate in a networked environment using logical connections to one or more remote computers, such as a remote computer 249. The remote computer 249 may be a workstation, a server computer, a router, a peer device or other common network node, and typically includes many or all of the elements described relative to the computer 220, although only a memory storage device 250 is illustrated in FIG. 10. The logical connections depicted in FIG. 10 may include a local area network (LAN) 251 and a wide area network (WAN) 252. Such networking environments are commonplace in offices, enterprise-wide computer networks, Intranets and the Internet.

When employed in a LAN networking environment, the computer 220 may be connected to the local network 251 through a network interface or adapter 253. When utilized in a WAN networking environment, the computer 220 generally may include a modem 254, and/or is connected to a communications server on the LAN, and/or has other means for establishing communications over the wide area network 252, such as the Internet. The modem 254, which may be internal or external, may be connected to the system bus 223 via the serial port interface 246. In a networked environment, program modules depicted relative to the computer 220, or portions thereof, may be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 220, unless otherwise indicated. Such acts and operations are sometimes referred to as being computer-executed. It will be appreciated that the acts and symbolically represented operations include the manipulation by the processing unit 221 of electrical signals representing data bits which causes a resulting transformation or reduction of the electrical signal representation, and the maintenance of data bits at memory locations in the memory system (including the system memory 222, hard drive 227, floppy disks 229, and CD-ROM 231) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system embodied on a computer readable storage medium for bridging disparate object systems, comprising:
    a first wrapper to bridge communications between a first object system and a second object system; and
    a second wrapper to bridge communications between the second object system and the first object system, wherein the first wrapper makes the second object system appear as if it were the first object system with respect to memory management for calls made to the second object system from the first object system and the second wrapper makes the first object system appear as if it were the second object system with respect to memory management for calls made to the first object system from the second object system, the first object system is a managed object system for memory management and the second object system is an unmanaged object system for memory management.

2. The system of claim 1, wherein the first wrapper and second wrapper further serve as a proxy to the respective object systems that point to a stub within the wrappers in order to marshal data between the object systems.

3. The system of claim 1, wherein the first wrapper further queries for type information from the second object system and forms interfaces from methods exposed from the type information.

4. The system of claim 1, wherein the second wrapper further calls the first object system and determines an interface by casting to a type and examining an exception.

5. The system of claim 4, wherein an adapter object is provided to map interfaces of an unknown type in the first object system to a known type in the second object system.

6. The system of claim 1, wherein the first object system is reference counted and the second object system is traced.

7. The system of claim 6, wherein the first wrapper maintains a traced reference for the second object system and reference counts interfaces utilized by the first object system.

8. The system of claim 6, wherein the second wrapper holds a traced reference for the second object system and releases interfaces utilized by the first object system.

9. The system of claim 6, further comprising a garbage collector to reclaim objects within the second object system, wherein unmanaged objects are reclaimed based upon the reference count in the first object system.

10. The system of claim 1, wherein object identities are maintained by utilizing a single managed wrapper per each object.

11. The system of claim 10, wherein a specialized wrapper is defined that subtypes off of a generic wrapper to simulate a class.

12. The system of claim 1, further comprising a bridging services component to detect an unmanaged interface call and direct a managed client to an unmanaged object.

13. A method embodied on a computer readable storage medium for bridging objects, comprising:

activating a wrapper from a first object system according to interface implementations of a second object system, wherein the wrapper makes the second object system appear as if it were the first object system with respect to memory management for calls made to the second object system from the first object system, the first object system is a managed object system for memory management and the second object system is an unmanaged object system for memory management; and utilizing the wrapper to facilitate transparent communications between the object systems.

14. The method of claim 13, further comprising, proxying the respective object systems from a stub within the wrappers in order to marshal data between the object systems.

15. The method of claim 13, further comprising, querying type information from the second object system; and forming interfaces from methods exposed from the type information.

16. The method of claim 13, further comprising, determining an interface by casting to a type; and examining an exception resulting from the caste.

17. The method of claim 13, further comprising, maintaining object identities by utilizing a single managed wrapper per each object.

18. A system embodied on a computer readable storage medium for bridging objects, comprising:

means for activating a wrapper from a first object system according to interface implementations of a second object system, wherein the wrapper makes the second object system appear as if it were the first object system with respect to memory management for calls made to the second object system from the first object system, the first object system employs managed code and the second object system employs unmanaged code; and means for utilizing the wrapper to facilitate transparent communications between the object systems.

19. The system of claim 18, further comprising, means for proxying the respective object systems in order to marshal data between the object systems.

* * * * *